US010838745B2

(12) United States Patent
Yao et al.

(10) Patent No.: US 10,838,745 B2
(45) Date of Patent: *Nov. 17, 2020

(54) LOADING DEPENDENCY LIBRARY FILES FROM A SHARED LIBRARY REPOSITORY IN AN APPLICATION RUNTIME ENVIRONMENT

(71) Applicant: International Business Machines Corporation, Armonk, NY (US)

(72) Inventors: Hai Feng Yao, Shanghai (CN); Jun Ming Guan, Shanghai (CN); Tian Qi Han, Shanghai (CN); Jing Hua Zhu, Shanghai (CN); Yi Fei He, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,845

(22) Filed: Sep. 4, 2019

(65) Prior Publication Data

US 2020/0285488 A1 Sep. 10, 2020

Related U.S. Application Data

(63) Continuation of application No. 16/293,621, filed on Mar. 5, 2019.

(51) Int. Cl.
*G06F 9/445* (2018.01)
*G06F 8/36* (2018.01)
*G06F 8/41* (2018.01)

(52) U.S. Cl.
CPC ............ *G06F 9/44521* (2013.01); *G06F 8/36* (2013.01); *G06F 8/433* (2013.01)

(58) Field of Classification Search
CPC ............................ G06F 9/44521; G06F 8/433
See application file for complete search history.

(56) References Cited

U.S. PATENT DOCUMENTS

| 7,711,775 B2 | 5/2010 | Tavis et al. |
| 8,719,804 B2 | 5/2014 | Jain |

(Continued)

FOREIGN PATENT DOCUMENTS

EP 2697714 2/2014

OTHER PUBLICATIONS

Office Action, dated Dec. 27, 2019, for U.S. Appl. No. 16/293,621 (137.12) , filed Mar. 5, 2019, Total 45 pages.

(Continued)

*Primary Examiner* — Charles E Anya
(74) *Attorney, Agent, or Firm* — David W. Victor; Konrad, Raynes, Davda and Victor LLP

(57) ABSTRACT

Provided are computer program product, system, and method for loading dependency library files from a shared library repository in an application runtime environment. A determination is made of a dependency tree of dependency library files for an application to load into an application runtime environment. A determination is made as to whether a shared library repository includes all the dependency library files in the dependency tree. The shared library repository is updated to include any dependency library files not in the dependency tree of the application. Access is provided to the dependency library files in the shared library repository in the dependency tree in the application runtime environment. The application is started in the application runtime environment in response to providing access to the dependency library files in the application runtime environment.

9 Claims, 8 Drawing Sheets

(56) References Cited

U.S. PATENT DOCUMENTS

| | | | |
|---|---|---|---|
| 9,104,504 B2 | 8/2015 | Chow et al. | |
| 9,280,338 B1 | 3/2016 | Stickle et al. | |
| 9,298,448 B2 | 3/2016 | Elia et al. | |
| 2007/0169103 A1 | 7/2007 | Bhatkhande et al. | |
| 2008/0244551 A1* | 10/2008 | Jung .................. | G06F 9/445 |
| | | | 717/163 |
| 2010/0017503 A1 | 1/2010 | Kim et al. | |
| 2012/0278902 A1 | 11/2012 | Martin et al. | |
| 2017/0206073 A1 | 7/2017 | Kirkpatrick et al. | |
| 2018/0060055 A1 | 3/2018 | Kirkpatrick | |
| 2018/0267796 A1 | 9/2018 | Kennedy et al. | |

OTHER PUBLICATIONS

Response to Office Action, dated Mar. 27, 2019, for U.S. Appl. No. 16/293,621 (137.12), filed Mar. 5, 2019, Total pp. 11.

Final Office Action, dated Apr. 6, 2020, for U.S. Appl. No. 16/293,621 (137.12), filed Mar. 5, 2019, Total pp. 38.

"Managing Shared Libraries" dated Sep. 7, 2018, IBM Knowledge Center, Managing Shared libraries, (online) retrieved from the Internet at URL>https://www.ibm.com/support/knowledgecenter/en/SSAW57_9.0.0/com.ibm.websphere.nd.multiplatform.doc/ae/tcws_sharedlib.html, Total 5 pages.

"Specifying Dependencies" dated 9/712018, (online) retrieved from the Internet at URL>https://cloud.google.com/appengine/docs/standard/nodejs/specifying-dependencies, Total 2 pages.

Wikipedia "Dependency Hell" (online) retrieved from the Internet on Feb. 16, 2019 at URL>https://en.wikipedia.org/wiki/Dependency_hell, Total 6 pages.

K. Hoffman, "Modern Dependency Management for Cloud-Natice Apps" dated Jul. 19, 2016, (online) retrieved from the Internet at URL>https://www.oreilly.com/ideas/modern-dependency-management-for-clo, Total 9 pages.

List of Patents and Application sTreated as Related, dated Sep. 4, 2019, Total 2 pages.

US Patent Application, dated Mar. 5, 2019, for U.S. Appl. No. 16/293,621 (137.12), filed Mar. 5, 2019, Total 30 pages.

Preliminary Amendment, dated Sep. 4, 2019, for U.S. Appl. No. 16/293,621 (137.12), filed Mar. 5, 2019, Total 7 pages.

Response to Final Office Action, dated Jun. 10, 2020, for U.S. Appl. No. 16/293,621 (137.12), filed Mar. 5, 2019, Total 11 pages.

Notice of Allowance, dated Jun. 24, 2020, for U.S. Appl. No. 16/293,621 (137.12), dated Mar. 5, 2019, Total 17 pages.

* cited by examiner

US 10,838,745 B2

LOADING DEPENDENCY LIBRARY FILES FROM A SHARED LIBRARY REPOSITORY IN AN APPLICATION RUNTIME ENVIRONMENT

BACKGROUND OF THE INVENTION

1. Field of the Invention

The present invention relates to a computer program product, system, and method for loading dependency library files from a shared library repository in an application runtime environment.

2. Description of the Related Art

Applications depend on libraries of files to run, where the files may be dependent on the presence of other library files to run. Complications arise in the management of library files when an application uses only a small part of a large library of files that are downloaded, when there are multiple chains of dependencies, and when there are multiple versions of the same package of library files. In network and cloud application deployments, applications in different client machines may require access to the same dependent libraries, such as nodejs or Java applications. (JAVA and is a registered trademark of Oracle America, Inc. throughout the world). The application deployments may download or copy the same dependent application libraries to the client, such as a target deployed cloud virtual machine or container. In such a network/cloud environment, numerous copies of the application libraries may be duplicated across the virtual machines and containers.

There is a need in the art for improved management of shared library files in a network computing environment.

SUMMARY

Provided are computer program product, system, and method for loading dependency library files from a shared library repository in an application runtime environment. A determination is made of a dependency tree of dependency library files for an application to load into an application runtime environment. A determination is made as to whether a shared library repository includes all the dependency library files in the dependency tree. The shared library repository is updated to include any dependency library files not in the dependency tree of the application. Access is provided to the dependency library files in the shared library repository in the dependency tree in the application runtime environment. The application is started in the application runtime environment in response to providing access to the dependency library files in the application runtime environment.

DETAILED DESCRIPTION

Described embodiments provide improvements to computer technology for managing dependency library files at client machines in a network or cloud computing environment by providing mechanisms to maintain all the application required library files for all machines in a shared library repository. With described embodiments, when loading an application, a determination is made of a dependency tree of dependent library files the application requires to run. At the time of loading, any dependency files in the dependency tree not included in the shared library repository are added to the repository. Access is provided to the dependency library files in the shared library repository in the dependency tree in the application runtime environment for the application to run.

With described embodiment, application runtime dependency is centralized in a shared library repository. Links to the shared library may be provided to the different client machines to deploy common dependency library files throughout machines in a network or cloud computing environment using components included in the application.

Figure 1:
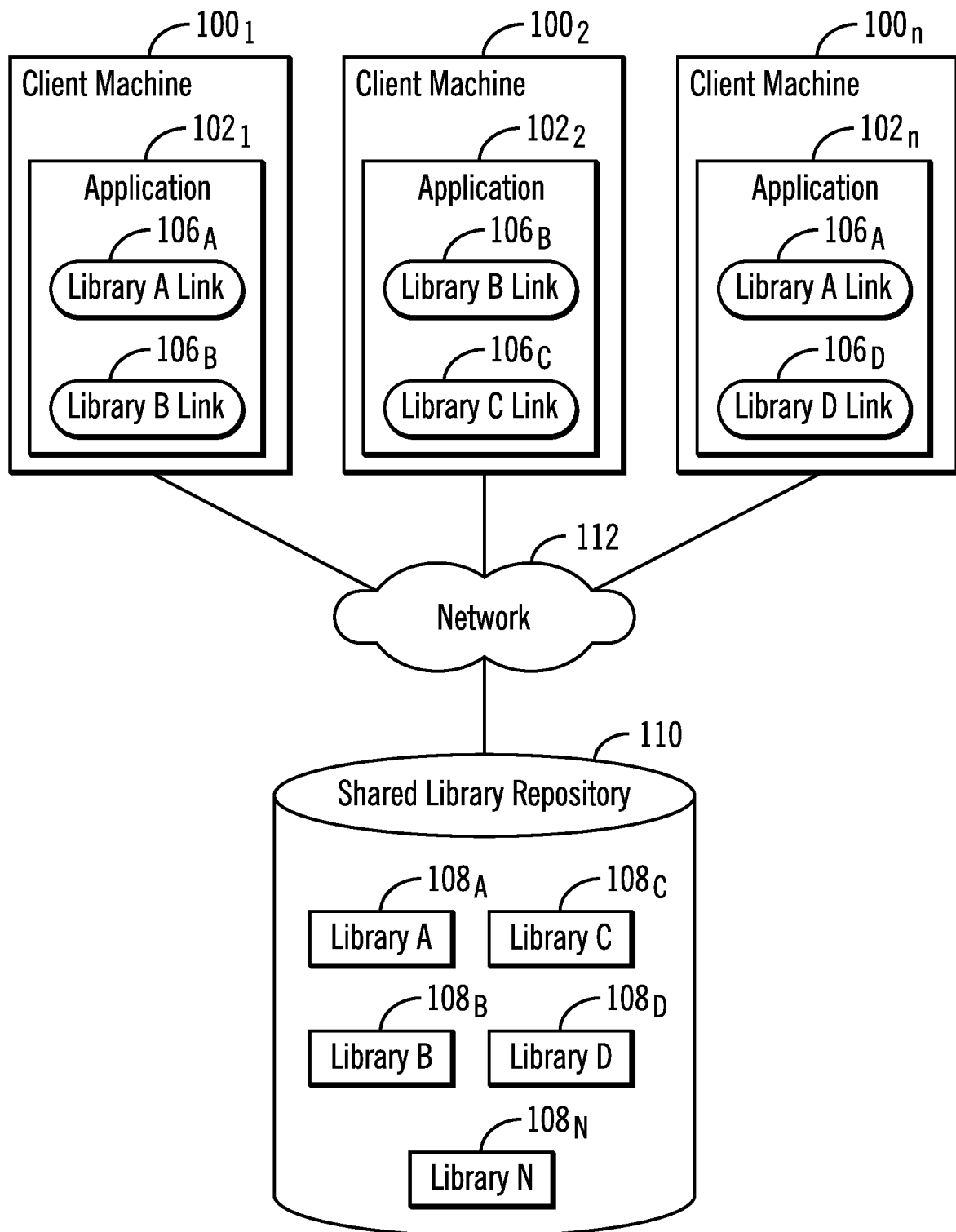
FIG. 1 illustrates an embodiment of a network computing environment.

FIG. 1 illustrates an embodiment of a network or cloud type computing environment including a plurality of client machines $100_1$, $100_2$ ... $100_n$, each having one or more applications $102_1$, $102_2$ ... $102_n$. Each application $102_1$, $102_2$ ... $102_n$ runtime environment includes links to dependency library files $106_A$, $106_B$, $106_C$, $106_D$, where the actual shared dependency library files $108_A$, $108_B$, $108_C$, $108_D$, in addition to dependency library files $108_N$ used by other applications, are stored in a centralized shared library repository 110. The applications $102_1$, $102_2$ ... $102_n$ access the shared library repository 110 over a network 112. In one embodiment, the application $102_i$ runtime environments include links $106_i$ to the library files $108_i$, such as symbolic links mounted through a network file system protocol. In alternative embodiments the application $102_i$ runtime environments may include the actual library files $108_i$ loaded into the runtime environment. The links $106_i$ to the dependent library files $108_i$ may comprise a text string that provides a path to the directories in the shared library repository 110 having the dependency library files $108_A$, $108_B$, $108_C$, $108_D$, $108_N$. The symbolic link may comprise an additional file that exists independently of the target file it represents.

The network 112 may comprise a network such as a Storage Area Network (SAN), Local Area Network (LAN), Intranet, the Internet, Wide Area Network (WAN), peer-to-peer network, wireless network, arbitrated loop network, etc. The network 112 may be part of a cloud computing environment.

The client machines $100_1$, $100_2$ ... $100_n$ may comprise virtual machines installed on a virtual machine host or physical machines. The client machines $100_1$, $100_2$ ... $100_n$ may be part of a network or cloud computing environment in which shared dependent library files are maintained in a centralized shared library repository 110 to reduce network bandwidth by maintaining all shared library files in a common repository, where applications maintain links, such as symbolic links, in the application runtime environments, to the dependent library files which are accessed when needed. Further, bandwidth may be conserved if dependency library files are downloaded to the application runtime environment by only downloading those dependency library files in a dependency tree of the application.

Figure 2:
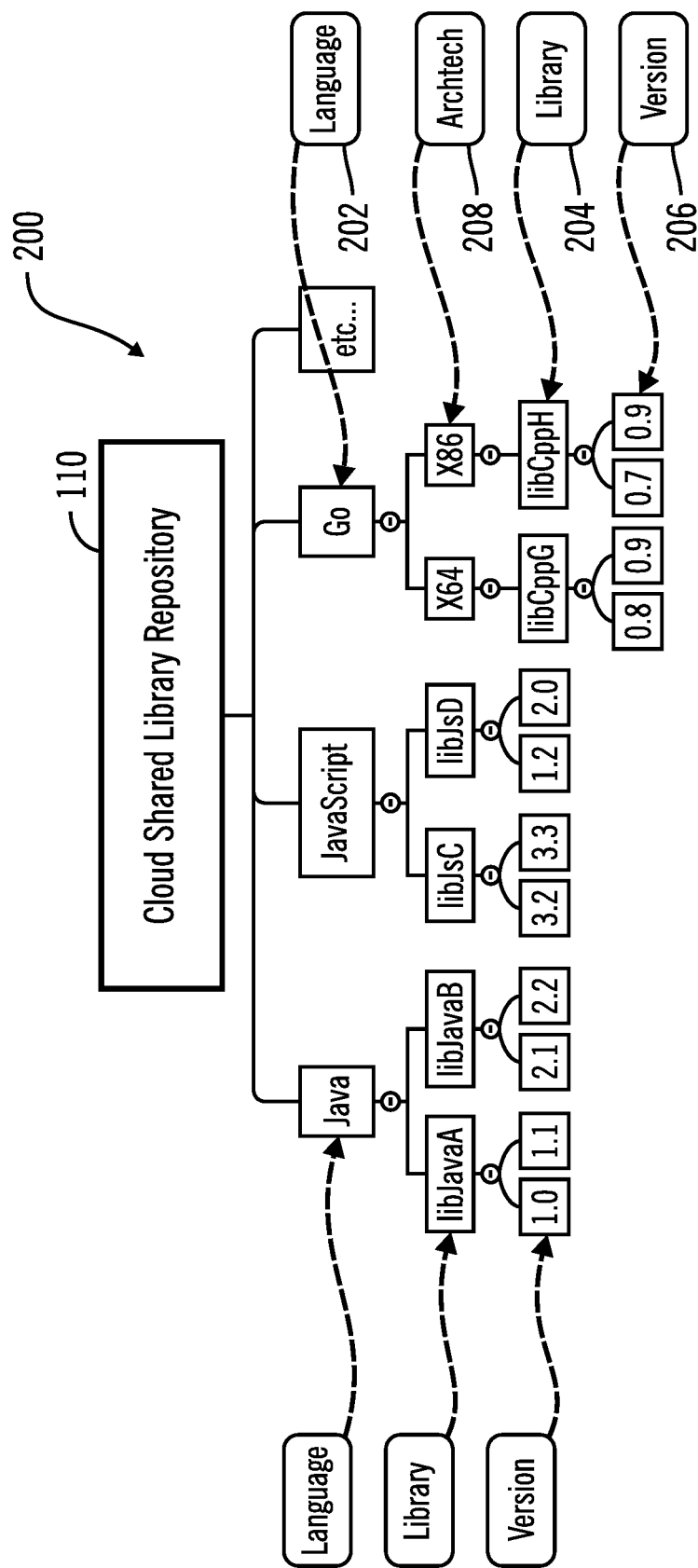
FIG. 2 illustrates an embodiment of a shared library repository.

FIG. 2 illustrates an embodiment of a hierarchical structure of the library files 200 stored in the shared library repository 110, where a first language level 202 provides the different computer program languages of the library files, such as Java®, JavaScript, Go, etc., a second library level 204 indicates a name of the library files, and a version level 206 indicates a version level where the actual files are maintained. (JAVA and JAVASCRIPT are registered trademarks of Oracle America, Inc. throughout the world). The library levels may further include an architecture level 208 if different library files are provided for different processor architectures, e.g., 32 bit, 64 bit, etc. With the described embodiments, the shared library files may provide dependency library files for applications written for different operating systems and computational environments in a large shared network or cloud computing environment, where applications running in different client machines may access library files for different languages, versions, etc.

Figure 3:
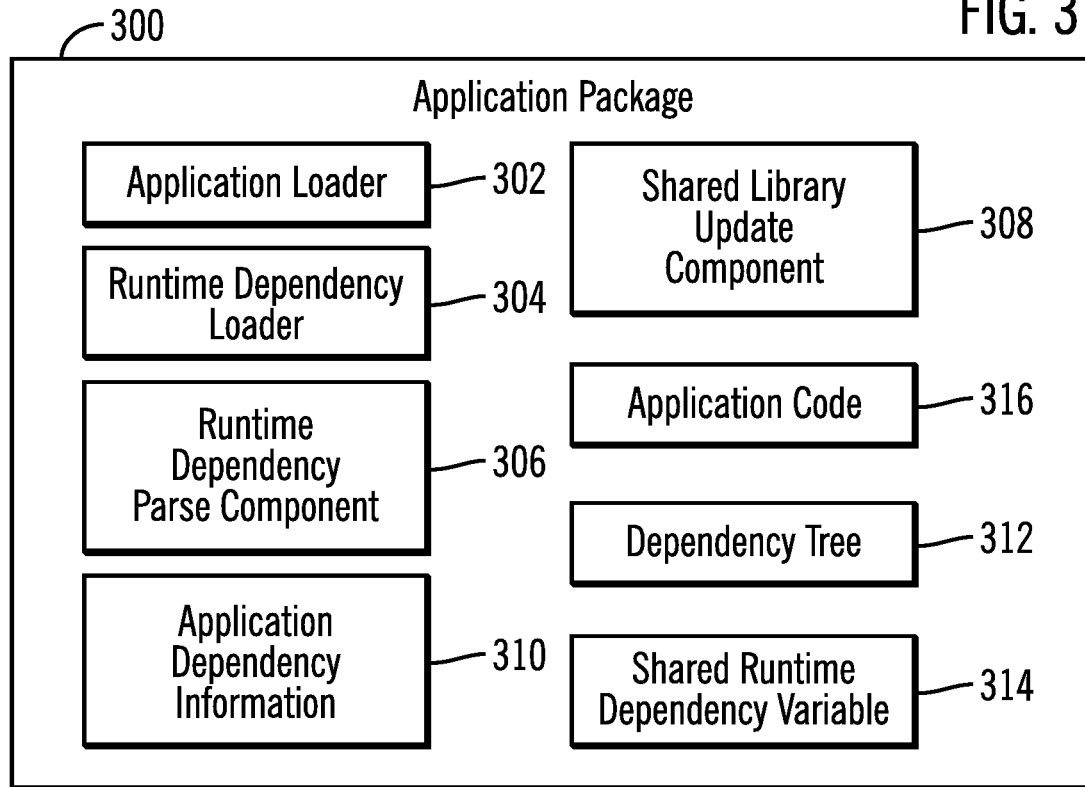
FIGS. 3 and 4 illustrate embodiments of components in an application to load dependency library files.
Figure 4:
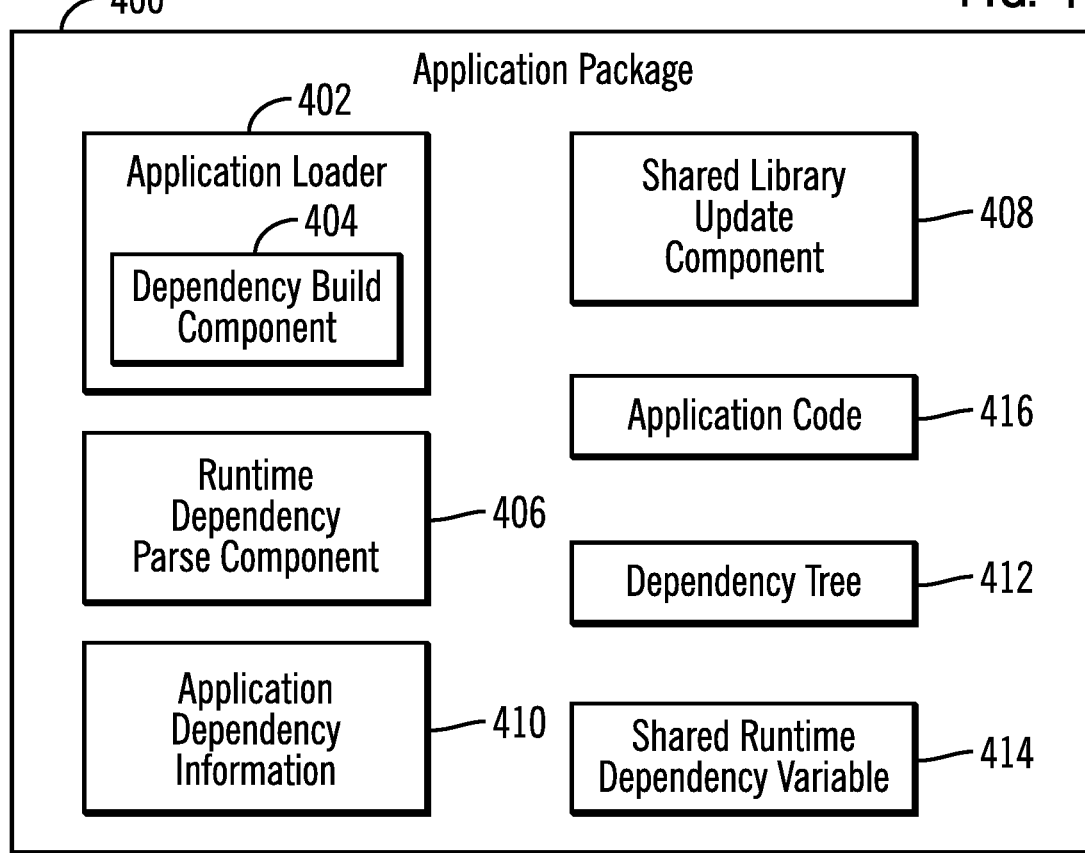

FIGS. 3 and 4 illustrate embodiments of load components included in application packages 300, 400, which may comprise embodiments of the applications $102_1$, $102_2$ . . . $102_n$.

FIG. 3 shows an application package 300 having code modules including an application loader 302, a runtime dependency loader 304, a runtime dependency parse component 306, shared library update component 308, application dependency information 310, a dependency tree 312, a shared runtime dependency variable 314, and the application code 316. The application loader 302 manages the deployment of the application $102_i$ in an application runtime environment at a client machine $100_i$. The runtime dependency loader 304 manages loading into the application runtime environment the links to dependency library files $106_i$ or the dependency library files $108_i$. The runtime dependency parse component 306 accesses application dependency information 310 and parses that information 310 to generate a dependency tree 312 providing a hierarchical structure of the dependency relationship of the dependency library files that the application code 364 requires to run. The shared library update component 308 is called to check whether the shared library repository 110 has all the dependency library files in the dependency tree 312, and if not, the shared library update component 308 will fetch the missing dependency library files $108_M$ to insert into the shared library repository 110. The shared runtime dependency variable 314 indicates whether the application package 300 includes a runtime dependency loader 304 to add the dependency library files to the application runtime environment.

FIG. 4 shows an alternative embodiment of an application package 400 that does not include a runtime dependency loader 304 and instead includes dependency build component 404 code injected in the application loader 402 to manage the loading of the dependency library files $108_i$ into the application runtime environment. In the embodiment of FIG. 4, the application loader 402 build component 404 manages building the dependency environment by creating dependency links $106_i$ to the dependency library files in the dependency tree 312. The application package 400 further includes components 406, 408, 410, 412, 414, 416, similar to components 306, 308, 310, 312, 314, and 316 described with respect to FIG. 3.

Figure 5A:
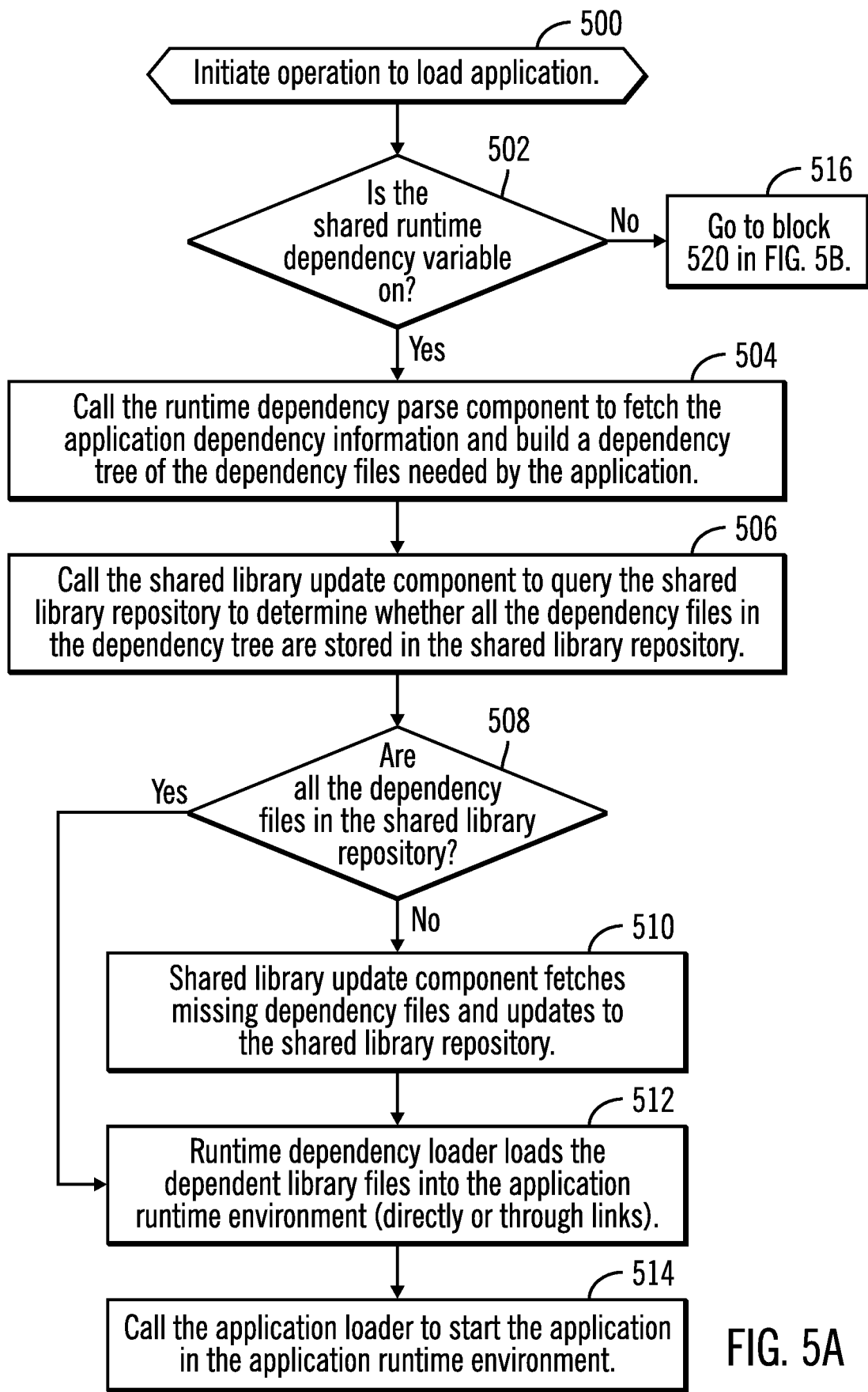
FIGS. 5a and 5b illustrate an embodiment of operations to load dependency library files for an application in the application runtime environment.
Figure 5B:
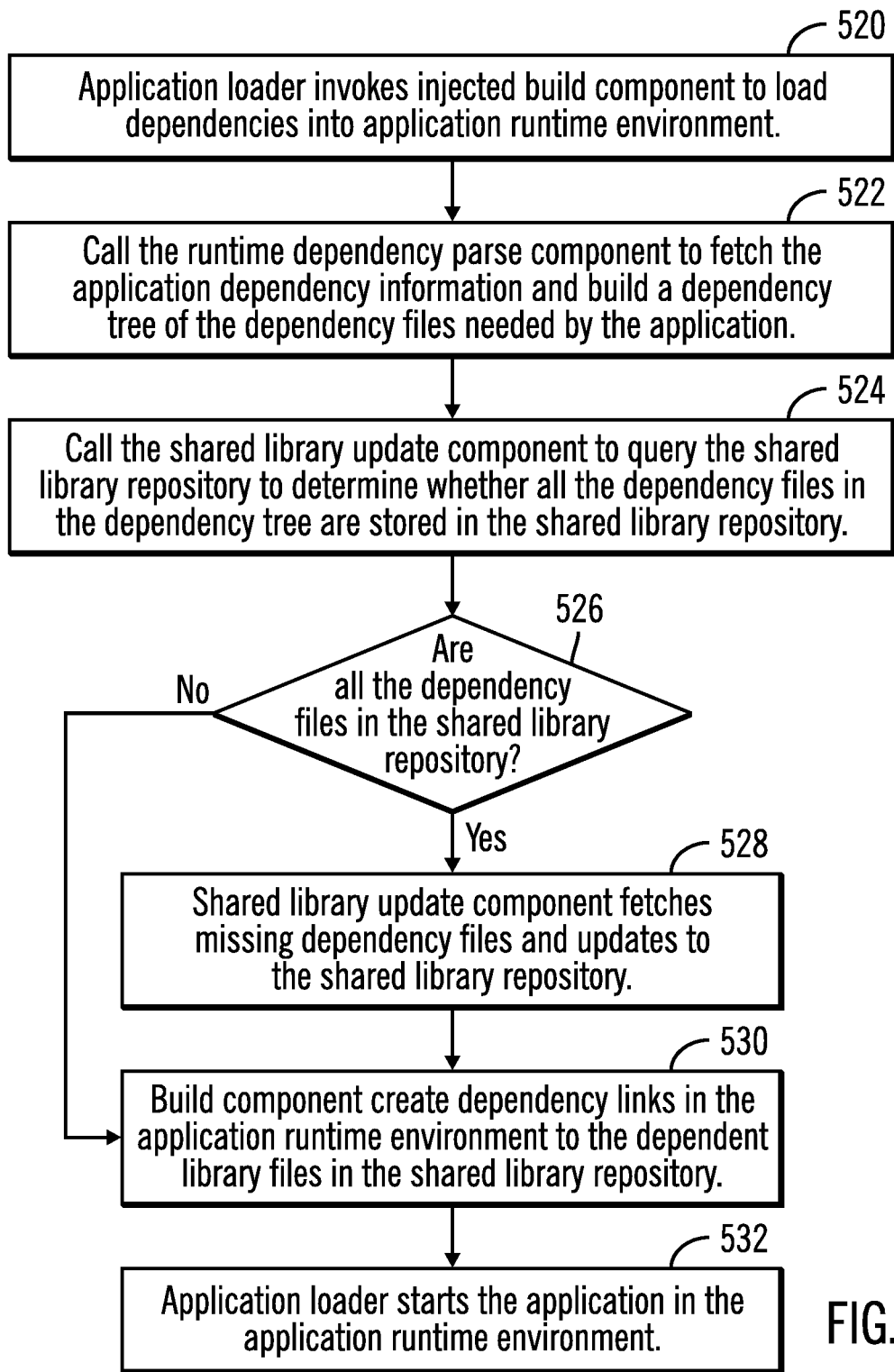

FIGS. 5a and 5b illustrate an embodiment of operations performed by components in an application package comprising the package 300 or 400 to load the dependency library files $108_i$ and run the application code 316, 416. With respect to FIG. 5a, upon initiating loading of an application $102_i$, which may have the arrangement of application 300 or 400, if (at block 502) the shared runtime dependency variable 314 or 414 is on, indicating there is a runtime dependency loader 304 in the application package 300, then the runtime dependency loader 303 is invoked and calls (at block 504) the runtime dependency parse component 306 to fetch the application dependency information 310 and builds a dependency tree 312 of the dependency files needed by the application 300. The runtime dependency loader 304 calls (at block 506) the shared library update component 308 to query the shared library repository 110 to determine whether all the dependency files in the dependency tree 312 are stored in the shared library repository 110.

If (at block 508) all the dependency files in the dependency tree 312 are not in the shared library repository 110, then the shared library update component 308 fetches (at block 510) the missing dependency files $108_M$ from another source, such as a third party site providing shared library files, and updates the shared library repository 110. After fetching missing dependency files $108_M$ to store in the shared library repository 110 (from block 510) or if (at block 508) all the dependency files $108_i$ in the dependency tree 312 are already available in the shared library repository 110, then the runtime dependency loader 304 loads (at block 512) the dependency library files into the application runtime environment (directly as files $108_i$ or by creating links $106_i$ to files in the shared library repository 110). After the dependency library files are loaded into the application runtime environment, the application loader 302 starts (at block 514) the application code 316.

If (at block 502) the shared runtime dependency variable is not on, indicating the application $102_i$ comprises application package 400 that does not include the runtime dependency loader 304, then control proceeds (at block 516) to block 520 in FIG. 5b where the application loader 402 invokes an injected dependency build component 404 to load the dependencies in the application runtime environment. The build component 520 calls (at block 522) the runtime dependency parse component 406 to fetch the application dependency information and build a dependency tree 412 of the dependency files needed by the application code 416. The build component 520 calls (at block 524) the shared library update component 408 to query the shared library repository 110 to determine whether all the dependency files in the dependency tree 412 are stored in the shared library repository 110. If (at block 526) all the dependency files in the dependency tree 412 are not in the shared library repository 110, then the shared library update component 408 fetches (at block 528) the missing dependency files $108_M$ and updates the shared library repository 110. After fetching missing dependency files $108_M$ to store in the shared library repository 110 (from block 528) or if (at block 526) all the dependency files in the dependency tree 412 are already in the shared library repository 110, then the dependency build component 520 creates (at block 530) dependency links $106_i$ in the application runtime environment to the dependent library files in the shared library repository 110. After the dependency file links $106_i$ are loaded into the application runtime environment, the application loader 402 starts (at block 532) the application code 316.

With the embodiment of FIGS. 5a and 5b, a shared runtime dependency variable 314, 414 is used to indicate where a runtime dependency loader 304 will load the dependency library files $108_i$ directly into the application runtime environment or create links $106_i$ to the dependency library files to access. Further in embodiments where the application 400 does not include a runtime dependency loader 304, then the application loader 402 is injected with a dependency build component 404 that creates the dependency links in the application runtime environment.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
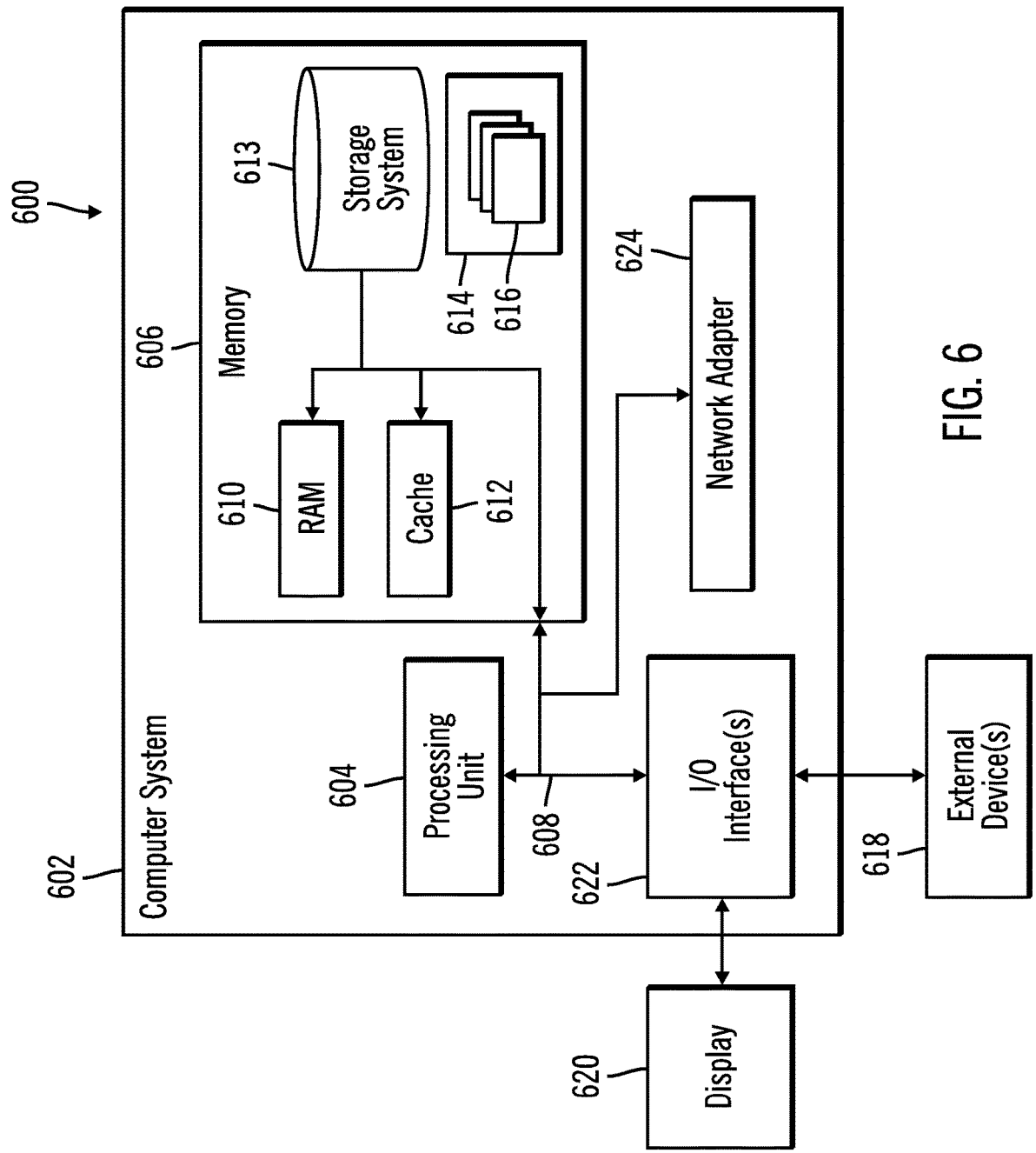
FIG. 6 depicts an embodiment of a cloud computing node.

Referring now to FIG. 6, a schematic of an example of a cloud computing node is shown, such as a client machine $100_1, 100_2 \ldots 100_n$, and the shared library repository 110 that implement a cloud based central repository for dependency library files. Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 20. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Figure 7:
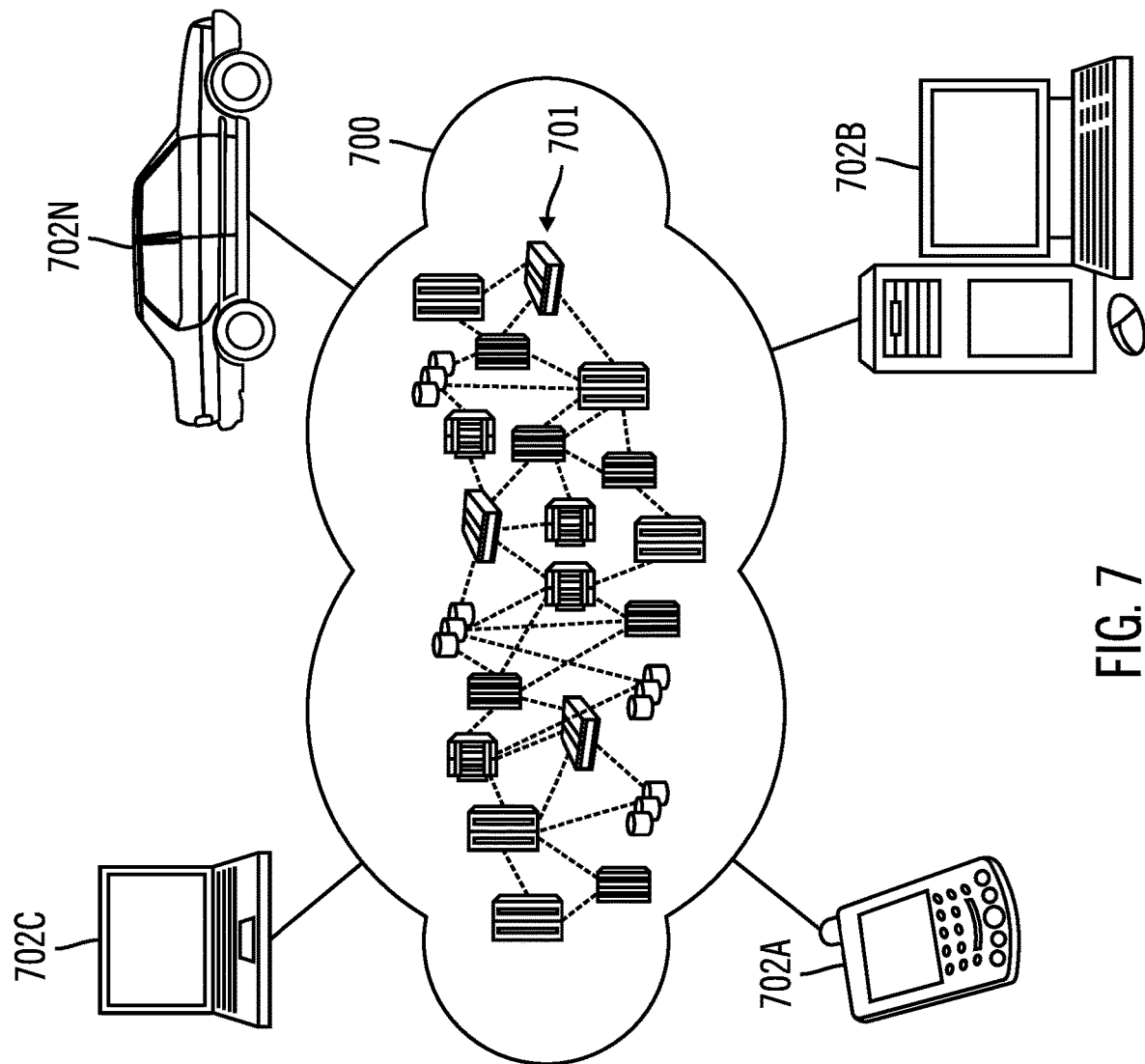
FIG. 7 depicts an embodiment of a cloud computing environment.

Referring now to FIG. 7, illustrative cloud computing environment 700 is depicted. As shown, cloud computing environment 700 comprises one or more cloud computing nodes 701, such as the machines $100_1, 100_2 \ldots 100_n$, with which local computing devices used by cloud consumers, such as, for example, personal digital assistant (PDA) or cellular telephone 702A, desktop computer 702B, laptop computer 702C, and/or automobile computer system 702N may communicate. The cloud consumers may comprise the cluster 100 that may require to offload or cloud burst workloads to the computing nodes 701. Nodes 701 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 702A-N shown in FIG. 7 are intended to be illustrative only and that computing nodes 701 and cloud computing environment 700 can communicate with any type of computerized device over any type of network and/or network addressable connection (e.g., using a web browser).

Figure 8:
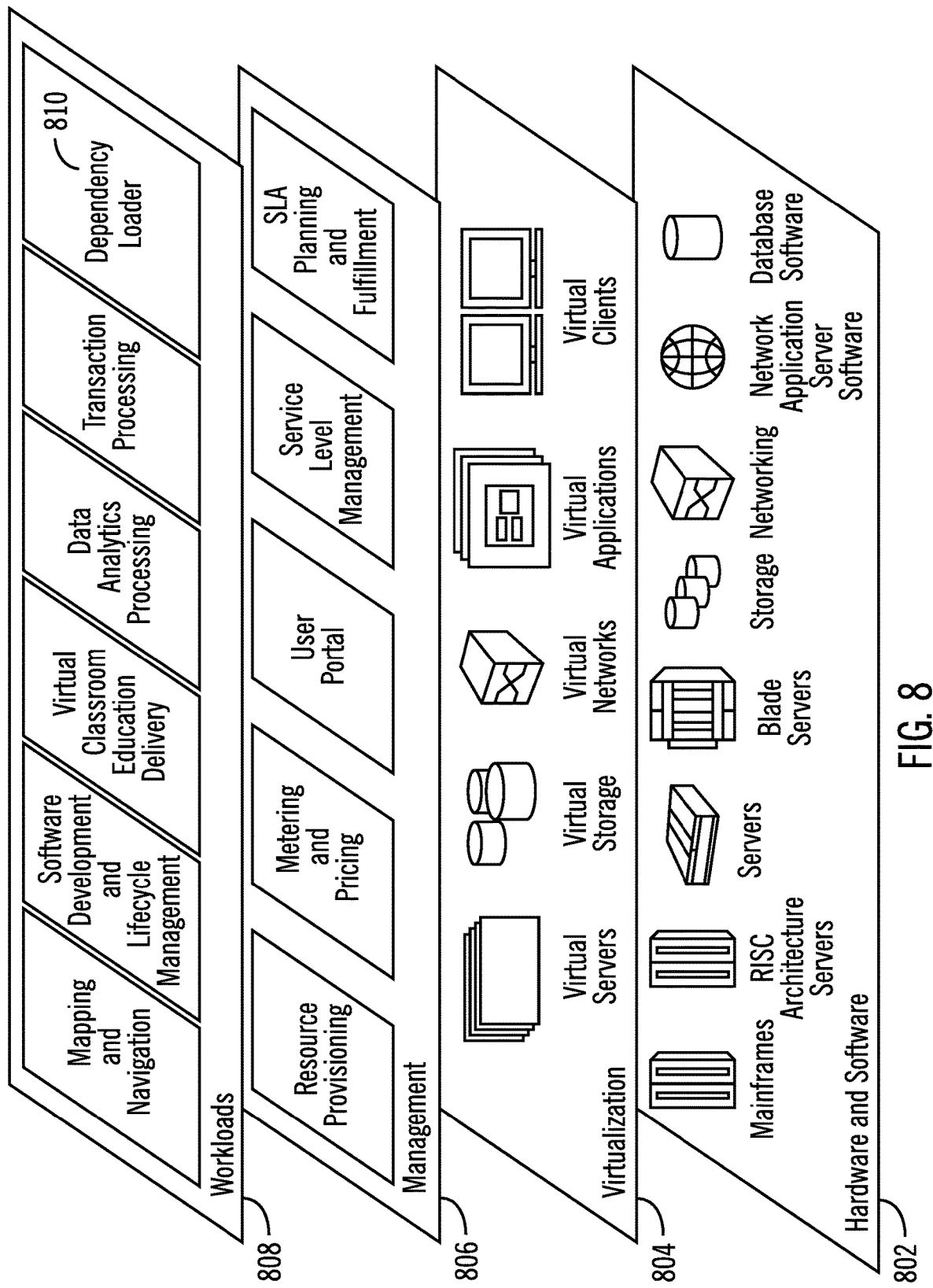
FIG. 8 depicts an embodiment of abstraction model layers of a cloud computing environment.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components.

Examples of hardware components include: mainframes; RISC (Reduced Instruction Set Computer) architecture based servers; storage devices; networks and networking components. In some embodiments, software components include network application server software.

Virtualization layer 804 provides an abstraction layer from which the following examples of virtual entities may be provided: virtual servers; virtual storage; virtual networks, including virtual private networks; virtual applications and operating systems; and virtual clients.

In one example, management layer 806 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 808 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a dependency loader 810 to load dependency library files into the application runtime environment are provided as part of the cloud computing service.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for loading dependency library files for an application, comprising:
   determining whether a dependency variable indicates there is a dependency loader in an application package in response to an operation to load the application in the application package;
   in response to determining that the dependency variable indicates there is the dependency loader in the application package, using a dependency parse component to determine a dependency tree of dependency library files for an application to load into an application runtime environment;
   determining whether a shared library repository includes all the dependency library files in the dependency tree, wherein the shared library repository includes dependency files shared by different applications in different client machines;
   updating the shared library repository to include any dependency library files not in the dependency tree of the application;
   providing, by the dependency loader, access to the dependency library files in the shared library repository in the dependency tree in the application runtime environment; and
   starting the application in the application runtime environment in response to providing access to the dependency library files in the application runtime environment.

2. The method of claim 1, wherein access to the dependency library files in the shared library repository are provided in a plurality of client machines for applications deployed in the client machines to use to access dependency library files in dependency trees of the applications.

3. The method of claim 1, wherein the providing access to the dependency library files in the shared library repository comprises creating links in the application runtime environment to the dependency library files in the shared library repository that are used to access the dependency library files to run in the application runtime environment.

4. The method of claim 1, further comprising:
   providing an application runtime variable that when set indicates the application includes a runtime dependency loader to perform the determining the dependency tree of dependency library files, updating the shared library repository, and the providing access to the dependency library files in the shared library repository.

5. The method of claim 1, wherein the dependency parse component parses application runtime dependency information to determine the dependency tree of the dependency library files the application requires to run, further comprising:

provide a shared library update component to determine whether the shared library repository includes all the dependency library files in the dependency tree and update the shared library repository to include any dependency library files not in the dependency tree of the application, wherein the dependency loader provides links to the dependency library files in the dependency tree for the application in the application runtime environment for use by the application to call the dependency library files.

6. The method of claim 1, wherein the access to the dependency library files are provided in response to at least one of updating the shared library repository to include any dependency library files and determining that the shared library repository includes all the dependency library files.

7. The method of claim 1, wherein the dependency loader provides access to the dependency library files in the dependency tree by loading the dependency library files in the dependency tree into the application runtime environment for use by the application in the application runtime environment.

8. The method of claim 1, wherein the application includes an application loader having a build component that provides access to the dependency library files in the dependency tree by creating links to the dependency library files in the shared library repository in the application runtime environment in response to determining that the dependency variable does not indicate there is the dependency loader in the application package, wherein the application will load the dependency library files into the application runtime environment when needed by the application.

9. The method of claim 1, wherein the application runtime environment is implemented in a client machine in communication over a network with a shared system including the shared library repository.

* * * * *